UNITED STATES PATENT OFFICE.

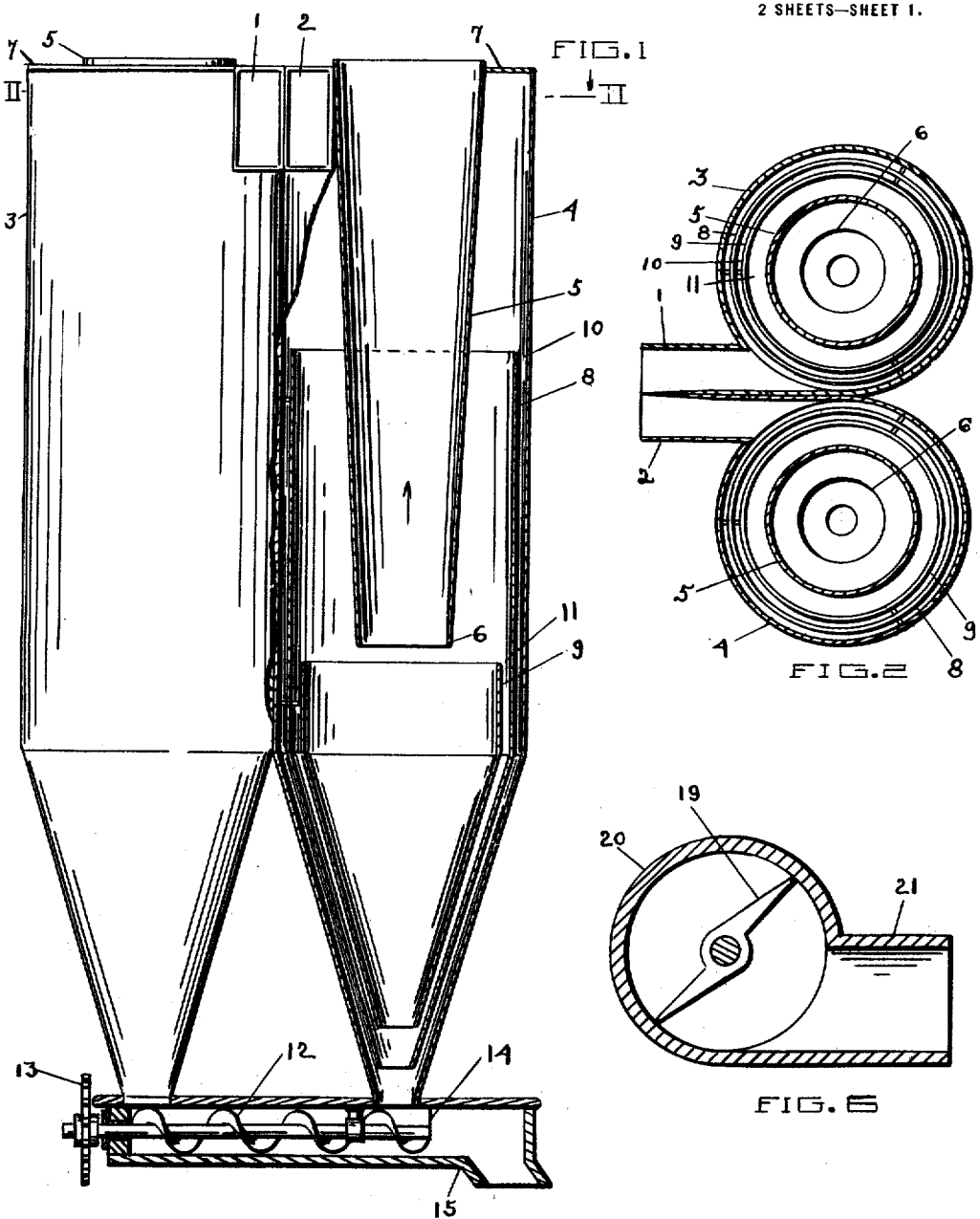

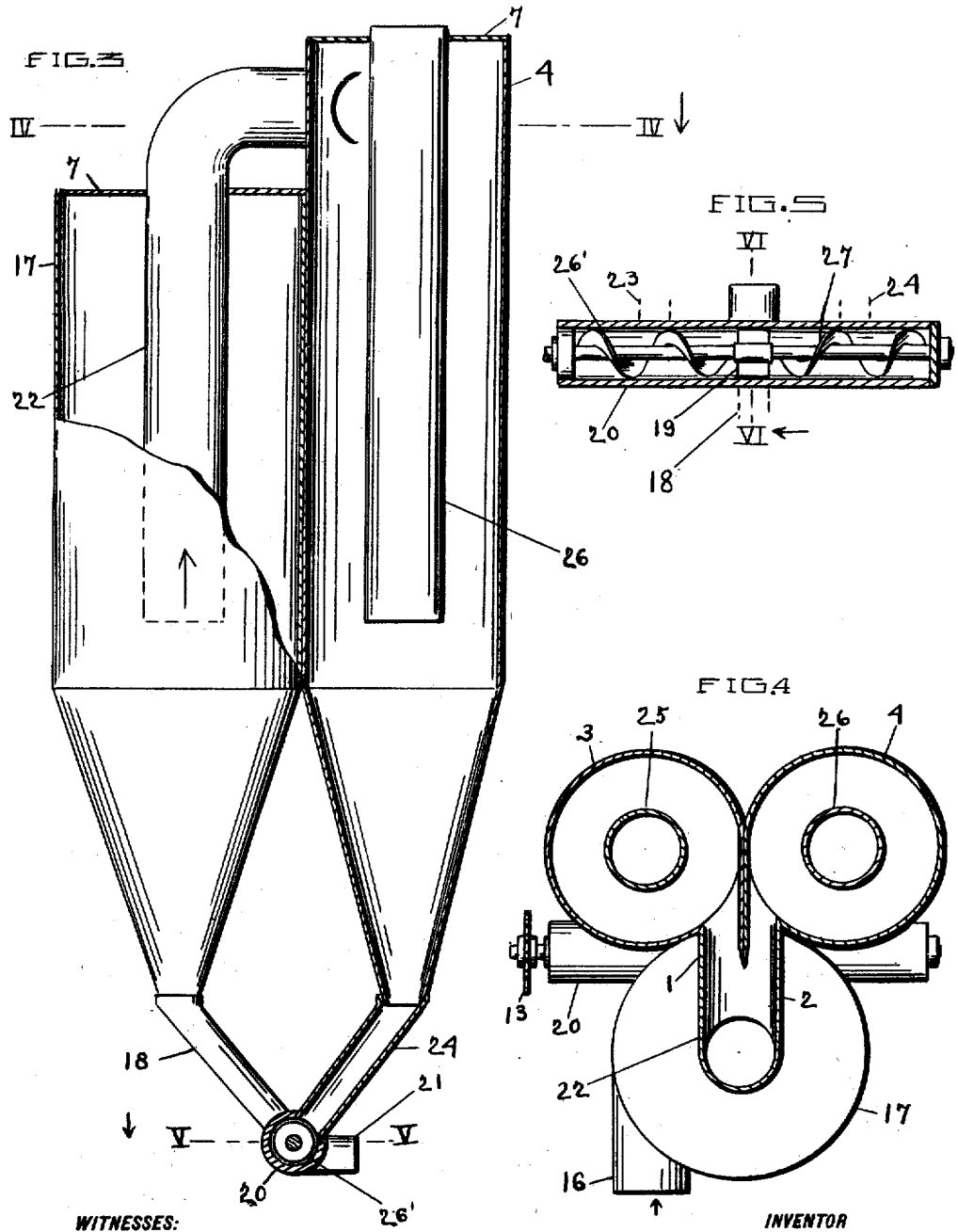

ALLEN C. BRANTINGHAM, OF TOLEDO, OHIO, AND LEWIS R. KEY, OF GUELPH, ONTARIO, CANADA; SAID KEY ASSIGNOR TO HUNTLEY MANUFACTURING COMPANY, OF SILVER CREEK, NEW YORK, A CORPORATION OF NEW YORK.

DUST-COLLECTOR.

1,239,456.

Specification of Letters Patent.

Patented Sept. 11, 1917.

Application filed January 26, 1914. Serial No. 814,577.

*To all whom it may concern:*

Be it known that we, ALLEN C. BRANTINGHAM, a citizen of the United States, residing at Toledo, Lucas county, Ohio, and LEWIS R. KEY, a subject of the King of Great Britain, residing at Guelph, Ontario, Canada, have invented new and useful Dust-Collectors, of which the following is a specification.

This invention relates to mechanism for removing, and even classifying, particles in suspension from a medium as gas.

This invention has utility when embodied as a dust collector particularly in connection with cereal mills, elevators, etc.

Referring to the drawings:

Figure 1 is a side elevation with parts broken away of a pair of dust collectors embodying the invention;

Fig. 2 is a section on the line II—II Fig. 1, looking in the direction of the arrow;

Fig. 3 is a side elevation with parts broken away of a dust collector grouping embodying the invention;

Fig. 4 is a section on the line IV—IV Fig. 3, looking in the direction of the arrow;

Fig. 5 is a section on the line V—V Fig. 3, looking in the direction of the arrow; and Fig. 6 is a section on the line VI—VI Fig. 5, looking in the direction of the arrow, on an enlarged scale.

The medium containing the particles in suspension, as dust laden air, may enter the ducts 1, 2, and be given respectively left and right hand swirls in the vessels 3, 4. These cylindrical vessels are provided with the tubular concentric ducts 5 having the discharge openings 6 from the cylindrical vessels 3, 4, a greater distance from the intake ends 7 than the diameter of said cylindrical vessels. By reason of this relative length provision as to diameter, the swirl of the particle laden air in the cylindrical vessel is of such extent that the particles in their abrupt travel as gaged by the velocity of supply through the intake openings quickly approach the periphery of the cylindrical vessels and when the air takes its reverse travel upward to go out through the tubes 5, there is caused a removal of particles therefrom proportionate to the velocity of air travel and the character of the matter in suspension. For instance, in mills located in cities or where there is smoke contamination occurring in the mill these devices of the invention used in connection with purifiers may make such classification in separation that the particles thrown against the walls of the cylindrical vessels may be a high grade flour and the discharge through the ducts 5 a smoke laden air. In other words, the classification or effectual cleaning occurs with a material financial saving to the miller. By tapering the ducts 5 and introducing sleeves 8, 9 in the cylindrical vessels, a shorter radius passage is provided, meaning that more abrupt changes in the directions of travel in the air swirls occur. This increases the effectiveness of centrifugal particle separation for entrance of the particles into the concentric particle receiving openings 10, 11, respectively between the sleeve 8 and the vessel 4 and between the sleeve 9 and the sleeve 8. These separations cut off particles of material from disturbance when the air current is reversed to go out the duct 5. However, the accumulation of particles in the tapered lower discharge vessels from the cylindrical vessels forms an air lock against air disturbance. This is produced by the packing member or scroll 12 continuously driven by the sprocket wheel 13 and having the terminal packing shoe 14 blocking the discharge way 15.

Instead of classifying by making a single separation and leaving say the normal impurities in the atmosphere to be taken out by the ducts 5 and so conducted to a stack the removed particles may be separated by stages in a single vessel or vessels in parallel, in some instances it may be desirable to arrange the collectors in series or series multiple as shown in Figs. 3 and 4. The tangential intake opening 16 similar to opening 1 or 2 supplies the cylindrical vessel 17 from which the separated particles may pass by the way 18 to the packing member 19 in the housing 20 which serves as an air lock in forcing the particles out through the discharge way 21. The packing member is driven continuously by the sprocket wheel 13. The partially cleaned air passes upward through the duct 22 into the ways 1, 2, supplying the cylindrical vessels 3, 4, having particle carrying discharge ducts 23, 24. The air thus cleaned or having the particles removed therefrom reverses its travel, goes upward and out the ducts 25, 26, which may extend to a stack outside the building and thus preclude the objectionable discharge of deleterious material within the factory or mill. The purity of the discharged air depends upon the capacity or rate of flow and of course upon the character of the air to be cleaned and the particles in suspension as well as the abruptness of the swirls in the mechanism of the disclosure.

In the devices of the invention it is possible to handle effectively a considerable volume of air and to attain whatever end may be desired as complete removal of particles in suspension or a classified removal as in the instance of high grade flour from the purifier dust by controlling the flow rate of the air. The device proper has practically no running parts—merely the packer which in the central discharge with the three grouped scheme of Figs. 3, 4, 5, has the scrolls 26', 27 oppositely pitched to work toward the kicker packing arms 19 for air locking the discharge 21.

The device may be simply made of sheet metal and as there is no accumulation in addition to that passing through the mechanism, the device acts uniformly at all times and precludes possibility of any danger whatever from dust troubles such as spontaneous combustion.

What is claimed and is desired to secure by Letters Patent is:

1. A dry dust collector comprising a cylindrical vessel having a downwardly tapering narrowing lower portion, and provided with an upper tangential supply opening and an axial upwardly discharging opening, a plurality of vertically disposed nested cylindrical tubes coaxially mounted in the vessel above the tapering portion, one of said tubes providing a vertically open way extending in the cylindrical portion of the vessel below the supply opening to adjacent the narrowing lower portion, said tube being disposed as to the cylindrical portion of the vessel to provide a uniform cross section vertically open annular way from the supply opening to the axial discharge opening effecting undisturbed dry annular centrifugal distribution of dust in the vessel against the vessel walls before reaching the region of the discharge opening, said tapering portion conducting the dust away from disturbance by the discharge opening, and a dry scroll conveyer for removing the dust conducted down by the tapering portion.

2. A cyclone dust collector provided with concentric particle receivers, a vertically clear entrance chamber thereover, said receivers each provided with a single top intake opening and a bottom discharge opening, the receivers between said openings being directed downwardly and inwardly only, and a central vertically open duct for the cleaned air from which the receivers have removed the centrifugally thrown particles, said vertically open duct extending below the intake opening to one of the particle receivers whereby the particle receivers preclude disturbance of the accumulated particles by the reverse air current of the discharge for cleaned air.

3. A cyclone dust collector provided with concentric particle receiving passages having intake openings disposed in longitudinal succession, and a central vertically open duct for the cleaned air from which the receiving passages therealong have successively removed the centrifugally thrown particles.

In testimony whereof we affix our signatures in the presence of two witnesses.

ALLEN C. BRANTINGHAM.
LEWIS R. KEY.

Witnesses:
Geo. E. Kirk,
C. H. Rauch.

Copies of this patent may be obtained for five cents each, by addressing the "Commissioner of Patents, Washington, D. C."